(12) United States Patent
Rose et al.

(10) Patent No.: US 10,525,785 B2
(45) Date of Patent: Jan. 7, 2020

(54) AIR SUSPENSION ASSEMBLY

(71) Applicant: BeijingWest Industries Co., Ltd., Beijing (CN)

(72) Inventors: Iain Rose, Luton Beds (GB); Jocelyn Marchand, Levallois Perret (FR); Dominique Fanelli, Bouffemont (FR)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 66 days.

(21) Appl. No.: 15/671,135

(22) Filed: Aug. 7, 2017

(65) Prior Publication Data

US 2018/0079274 A1    Mar. 22, 2018

Related U.S. Application Data

(60) Provisional application No. 62/398,131, filed on Sep. 22, 2016.

(51) Int. Cl.
| | |
|---|---|
| *F16F 9/04* | (2006.01) |
| *B60G 17/052* | (2006.01) |
| *B60G 11/27* | (2006.01) |

(52) U.S. Cl.
CPC .......... *B60G 17/0521* (2013.01); *B60G 11/27* (2013.01); *F16F 9/04* (2013.01)

(58) Field of Classification Search
CPC ...... F16F 9/04; F16F 9/05; F16F 9/057; F16F 9/0472; F16F 9/049; B60G 2206/424; B60G 17/0485; B60G 17/0521

See application file for complete search history.

(56) References Cited

U.S. PATENT DOCUMENTS

| | | |
|---|---|---|
| 6,374,966 B1 | 4/2002 | Lillbacka |
| 6,644,632 B1 | 11/2003 | Jaberg |
| (Continued) | | |

FOREIGN PATENT DOCUMENTS

| | | |
|---|---|---|
| CN | 103765034 | 4/2014 |
| CN | 104246282 | 12/2014 |
| (Continued) | | |

OTHER PUBLICATIONS

Abstract for DE 10 2009 011 414 (no date).*
(Continued)

*Primary Examiner* — Nicholas J Lane
(74) *Attorney, Agent, or Firm* — William H. Honaker; Dickinson Wright PLLC

(57) ABSTRACT

An air suspension assembly includes a top and a piston. A bellows connects the top and the piston defining a first chamber. The piston includes an upper portion defining a bore in communication with the first chamber. A body extends outwardly from the upper portion to a proximal end defining a second chamber. A decoupler is disposed in the bore in communication with the first chamber and the second chamber. The decoupler includes a partition member extending across the decoupler isolating the first chamber from the second chamber for changing pressure in response to a pressure applied to the air suspension assembly. The decoupler includes a cap portion disposed in the bore, defining a hole, and an extension portion extending outwardly from the cap portion to a distal end defining a third chamber in communication with the hole, the first chamber, and the second chamber to receive the partition member.

6 Claims, 5 Drawing Sheets

(56) References Cited

U.S. PATENT DOCUMENTS

| | | |
|---|---|---|
| 8,403,115 B2 | 3/2013 | Gartner et al. |
| 8,540,221 B2 | 9/2013 | Watanabe |
| 8,540,222 B2 | 9/2013 | Westnedge et al. |
| 8,740,577 B2 | 6/2014 | Herges |
| 8,844,912 B2 | 9/2014 | Naber |
| 9,168,803 B2 | 10/2015 | Buttner |
| 2004/0026836 A1 | 2/2004 | Brookes |
| 2011/0049774 A1 | 3/2011 | Naber |
| 2013/0234377 A1 | 9/2013 | Leonard |
| 2014/0054833 A1 | 2/2014 | Neitzeel et al. |
| 2014/0070468 A1 | 3/2014 | Leonard |
| 2015/0008627 A1 | 1/2015 | Leonard |
| 2016/0169315 A1 | 6/2016 | DeBruler |

FOREIGN PATENT DOCUMENTS

| | | | | |
|---|---|---|---|---|
| DE | 4300669 C1 | | 8/1994 | |
| DE | 03177633 A | | 8/1999 | |
| DE | 12009011414 | | 9/2010 | |
| DE | 102009011414 A1 | * | 9/2010 | ......... B60G 17/0155 |
| DE | 102011115986 A1 | | 4/2013 | |
| DE | 102013107826 A1 | * | 1/2015 | ............ B60G 17/04 |
| EP | 0474171 | | 9/1994 | |
| EP | 2243977 | | 4/2010 | |
| GB | 917890 | | 2/1963 | |
| JP | 57-001843 | | 1/1982 | |
| JP | 05-077639 U | | 10/1993 | |
| JP | 0577638 U | | 10/1993 | |
| JP | 07286636 A | | 10/1995 | |
| JP | 2009154547 A | | 7/2009 | |
| JP | 2014534389 | | 12/2014 | |
| KR | 1020070102926 | | 11/2012 | |
| WO | 2011124325 | | 10/2011 | |
| WO | 2012107285 | | 8/2012 | |
| WO | 2013075036 | | 5/2013 | |

OTHER PUBLICATIONS

Machine translation for DE 10 2013107826 (no date).*
First Office Action issued for corresponding Japanese Patent Application 2017-177213 dated Aug. 28, 2018.
Partial European Search Report dated Feb. 12, 2018, for counterpart European Patent Application No. 17001578.8, 17 pages.
First Office Action and search report dated Feb. 25, 2019 for counterpart Chinese patent application No. 201710696168.4, along with translation.

* cited by examiner

AIR SUSPENSION ASSEMBLY

CROSS REFERENCE TO RELATED APPLICATION

This application claims the benefit of provisional application Ser. No. 62/398,131 filed on Sep. 22, 2016, the contents of which are incorporated herein by reference in their entirety.

BACKGROUND OF THE INVENTION

1. Field of the Invention

The present invention generally relates to an air suspension assembly.

2. Description of the Prior Art

Air suspension assemblies are often used in the axle/suspension systems of a vehicle. The air suspension assemblies act to cushion the ride, dampen vibrations and stabilize the vehicle. One such air suspension assembly is disclosed in U.S. Patent Application 2011/0049774 which discloses the air suspension assembly including a top disposed on a center axis. A piston is disposed on the center axis spaced from the top. A bellows of an elastomeric material extending about the center axis between a first end secured to the top and a second end secured to the piston connecting the top and the piston defining a first chamber extending between the top and the piston and the bellows. The piston includes an upper portion defining a bore disposed on the center axis extending in gas communication with the first chamber. The piston includes a body extending outwardly from the upper portion and about the center axis to a proximal end defining a second chamber extending between the body and the upper portion. A decoupler is disposed in the bore of the upper portion attached to the piston and in gas communication with the first chamber and the second chamber.

SUMMARY OF THE INVENTION

The invention provides for an air suspension assembly including a decoupler wherein the decoupler includes a partition member extending transversely across the decoupler isolating the first chamber from the second chamber and defining a first volume and a second volume for changing pressure in the first chamber and the second chamber by varying the first volume and the second volume in response to a pressure applied to the air suspension assembly. The first volume for the first chamber extends between the partition member, the top, the piston, and the bellows. The second volume for the second chamber extends between the partition member and the body.

Advantages of the Invention

The invention in its broadest aspect provides for an air suspension assembly that has a soft rating of stiffness under low amplitude strokes which improves the overall ride comfort for a driver and a stiff rating of stiffness under large amplitude strokes which improves handling and roll stability. Furthermore, the invention provides both cost reduction and mass reduction and energy consumption reduction by eliminating the electric valves previously used in other air suspension assemblies.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
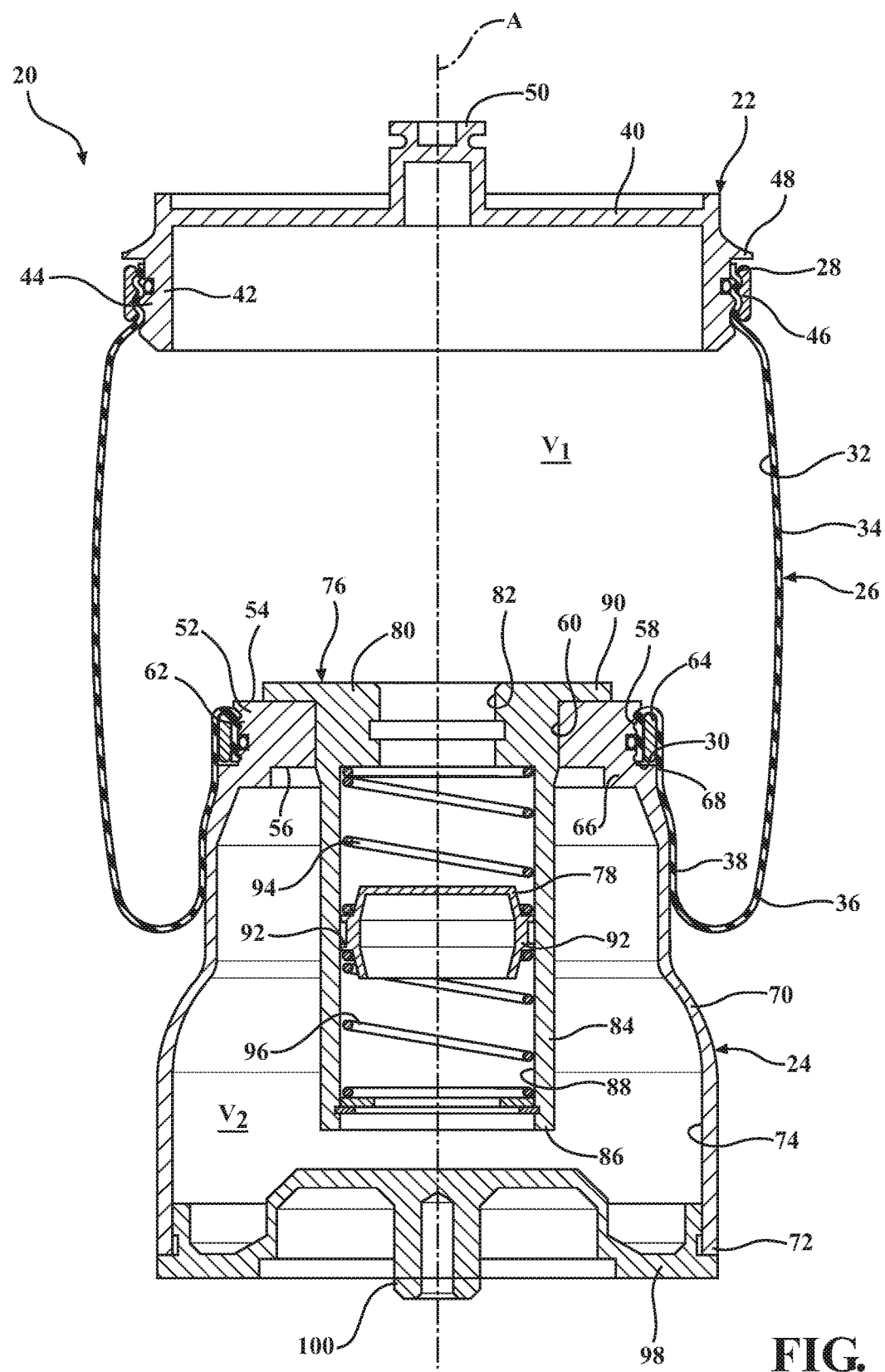
FIG. 1 is a cross-sectional perspective view of the air suspension assembly.

Referring to the Figures, wherein like numerals indicate corresponding parts throughout the several views, an air suspension assembly 20 for use in a vehicle is generally shown in FIG. 1.

The air suspension assembly 20, as generally shown in FIG. 1, includes a top 22 disposed on a center axis A. The top 22 may have a cylindrical shape and an inverted U-shape in cross-section. A piston 24 is disposed on the center axis A spaced from the top 22. The piston 24 may have an inverted cup shape and an inverted U-shape in cross-section. A bellows 26 of an elastomeric material and having a tubular shape is disposed on the center axis A and extends annularly about the center axis A between a first end 28 and a second end 30. The first end 28 of the bellows 26 is secured to the top 22 and the second end 30 of the bellows 26 is secured to the piston 24 defining a first chamber 32 extending between the top 22, the piston 24, and the bellows 26. In other words, the bellows 26 connects the top 22 to the piston 24 forming the first chamber 32 between the top 22, the bellows 26, and the piston 24.

The bellows 26 has an outer sleeve 34 extending from the first end 28 of the bellows 26 to an intermediate end 36 in a parallel relationship with the center axis A. The outer sleeve 34 may be of a tubular shape. The bellows 26 further includes an inner sleeve 38 extending from the intermediate end 36 of the bellows 26, in an arcuate shape, toward the center axis A and toward the first end 28 of the bellows 26, in a parallel relationship with the center axis A and the outer sleeve 34, to the second end 30 to engage the piston 24.

The top 22 includes a plate 40 disposed on the center axis A defining an edge extending about the plate 40. The plate 40 may have a circular shape. A side wall 42 having a cylindrical shape extends perpendicularly outwardly from the edge of the plate 40 in a parallel relationship with the center axis A. The side wall 42 includes a plurality of protrusions 44, spaced from one another, extending outwardly from the side wall 42 and annularly about the side wall 42 in a perpendicular relationship with the center axis A to receive the first end 28 of the bellows 26. A first ring 46 having a circular shape is disposed on the bellows 26 at the first end 28 of the bellows 26 and extending annularly about the side wall 42 of the top 22 to secure the bellows 26 to the side walls 42 of the top 22. In other words, the first end 28 of the bellows 26 is sandwiched and secured by the first ring 46 between the first ring 46 and the side walls 42 of the top 22. The side wall 42 includes a nub 48, having a triangular shaped cross-section, disposed adjacent to the protrusions 44 and the edge of the plate 40, extending outwardly from the side wall 42 and annularly about the side wall 42 for receiving the first ring 46. A first bushing 50, having a cylindrical shape, is disposed on the center axis A and extending outwardly from the center axis A, away from the side wall 42, and along the center axis A for securing the air suspension assembly 20 to the vehicle.

The piston 24 includes an upper portion 52 having a circular shape. The upper portion 52 has an interior surface 54 disposed in the first chamber 32 facing the top 22 and an exterior surface 56 spaced from the interior surface 54. A periphery 58 extends between the interior surface 54 and the exterior surface 56 and annularly about the center axis A to connect the interior surface 54 with the exterior surface 56. The upper portion 52 defines a bore 60, having a cylindrical shape, disposed on the center axis A and extends between the interior surface 54 and the exterior surface 56 in gas communication with the first chamber 32. The periphery 58 including a plurality of ridges 62, spaced from one another, and extends outwardly from the upper portion 52 in a perpendicular relationship with the center axis A to engage the second end 30 of the bellows 26. A second ring 64 having a circular shape is disposed at the second end 30 of the bellows 26 and extends annularly about the upper portion 52 of the piston 24 to secure the bellows 26 to the upper portion 52 of the piston 24. In other words, the second end 30 of the bellows 26 is sandwiched and secured by the second ring 64 between the second ring 64 and the upper portion 52 of the piston 24. A tab 66 is disposed adjacent to the exterior surface 56 of the upper portion 52 and extends outwardly from and annularly about the upper portion 52 to a terminal end 68 defining a shoulder disposed adjacent to the periphery 58 for receiving the second ring 64.

The piston 24 further includes a body 70 having a bell shape attached to the upper portion 52 of the piston 24. The body 70 may extend from the terminal end 68 of the tab 66 and annularly about the center axis A from the terminal end 68 of the tab 66 to a proximal end 72 defining a second chamber 74 extending between the body 70 and the upper portion 52.

A decoupler 76 is disposed in the bore 60 of the upper portion 52 and attached to the piston 24 in gas communication with the first chamber 32 and the second chamber 74. The decoupler 76 includes a partition member 78 extending transversely across the decoupler 76 to isolate the first chamber 32 from the second chamber 74 defining a first volume $V_1$ for the first chamber 32 and a second volume $V_2$ for the second chamber 74. The first volume $V_1$ extends between the partition member 78, the top 22, the piston 24, and the bellows 26. The second volume $V_2$ extends between the partition member 78 and the body 70 of the piston 24. In response to a pressure applied to the air suspension assembly 20, the decoupler 76 compensates for changes in pressure in the first chamber 32 and the second chamber 74 by varying the first volume $V_1$ and the second volume $V_2$.

The decoupler 76 includes a cap portion 80 disposed adjacent to the interior surface 54, in the bore 60 of the upper portion 52, and defining a hole 82 disposed on the center axis A. The decoupler 76 also includes an extension portion 84, having a tubular shape, disposed in the second chamber 74 and extending annularly outwardly from the cap portion 80 to a distal end 86. The extension portion 84 defines a third chamber 88 in gas communication with the hole 82, the first chamber 32, and the second chamber 74 to receive the partition member 78. The cap portion 80 may include a collar 90 extending radially outwardly from the cap portion 80, in a perpendicular relationship with the center axis A, and annularly about the cap portion 80 to engage the interior surface 54 of the upper portion 52. It should be appreciated that the cap portion 80 can be secured to the upper portion 52 by any means, e.g. nuts and bolts or welding.

As shown in FIG. 1, the partition member 78 is a diaphragm 78 having a hexagonal shaped cross-section disposed on the center axis A and slidable in the third chamber 88 of the extension portion 84 isolating the first chamber 32 from the second chamber 74. The diaphragm 78 also includes a projection 92 extending radially outwardly from the diaphragm 78 and about the diaphragm 78 in a perpendicular relationship to the center axis A abutting the extension portion 84 of the decoupler 76. A Teflon band may be disposed annularly about the projection 92 sandwiched between the projection 92 and the extension portion 84 of the decoupler 76 for facilitating with the sliding movement of the diaphragm 78 inside the extension portion 84. A plurality of retaining members 94, 96 including a first retaining member 94 and a second retaining member 96 are disposed in the third chamber 88, spaced apart from one another, and sandwiching the diaphragm 78 between the retaining members 94, 96 to allow the diaphragm 78 to move between a first position and a second position. The first position is defined as being adjacent to the cap portion 80 and the second position is defined as adjacent to the distal end 86 of the extension portion 84 to provide a soft stiffness rate under low stroke and higher stiffness rate under larger strokes. In other words, the diaphragm 78 is sandwiched between the first retaining member 94 and the second retaining member 96 and in the third chamber 88 of the extension portion 84 between the first position and the second position. It should be appreciated that the first retaining member 94 may be a spring disposed in the third chamber 88 extending between the cap portion 80 and the diaphragm 78. In should also be appreciated that the second retaining member 96 may also be a spring disposed in the third chamber 88 extending between the diaphragm 78 and the distal end 86 of the extension portion 84.

The body 70 of the piston 24 may include a base 98 having a circular shape disposed on the center axis A and attached to the proximal end 72 of the body 70 to close the second chamber 74. A second bushing 100 extends outwardly from the base 98 opposite the first bushing 50 along the center axis A for securing the air suspension assembly 20 to the vehicle.

Figure 2:
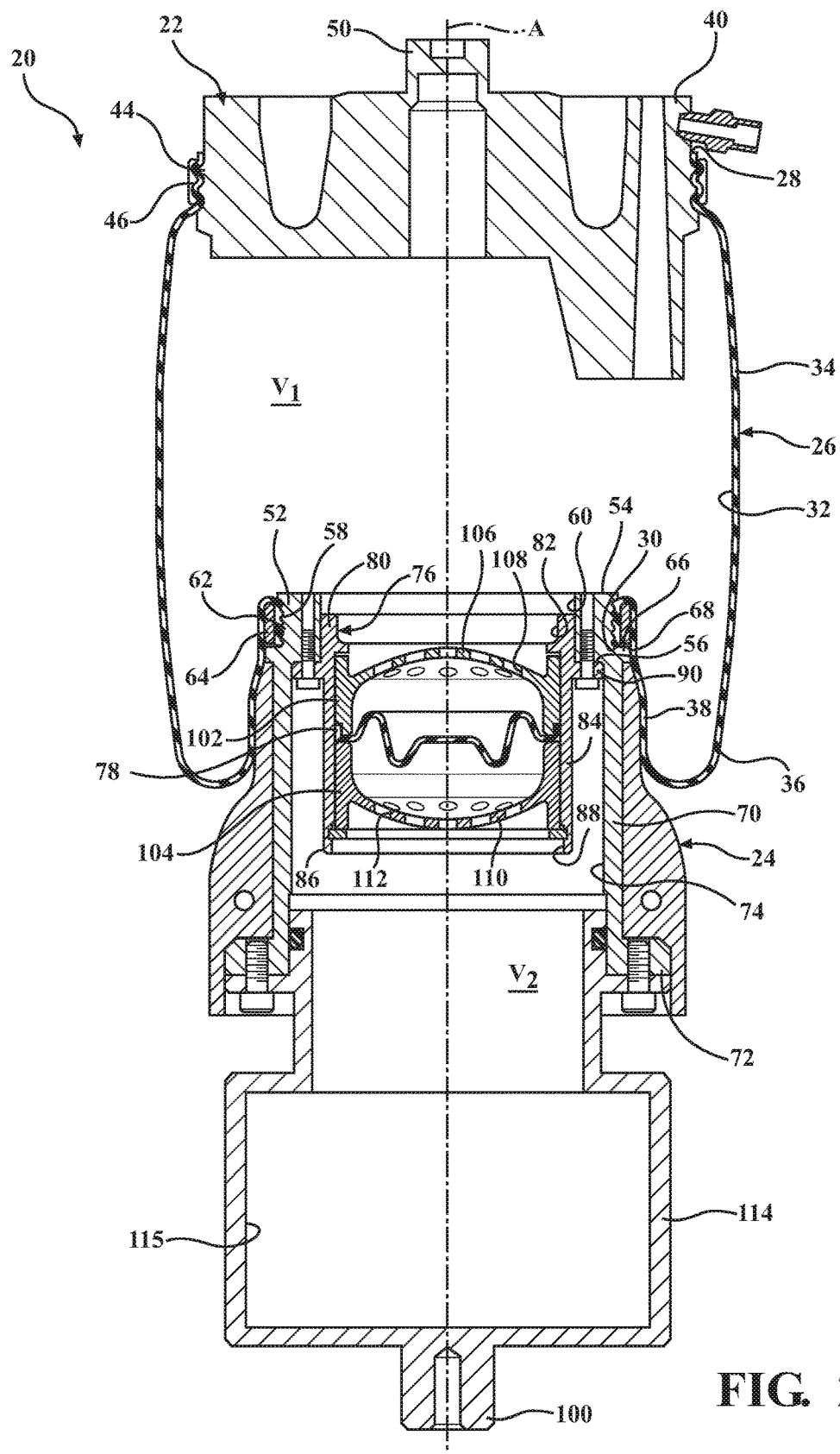
FIG. 2 is a cross-sectional perspective view of an alternative embodiment of the air suspension assembly including an alternative embodiment of the decoupler.
Figure 3:
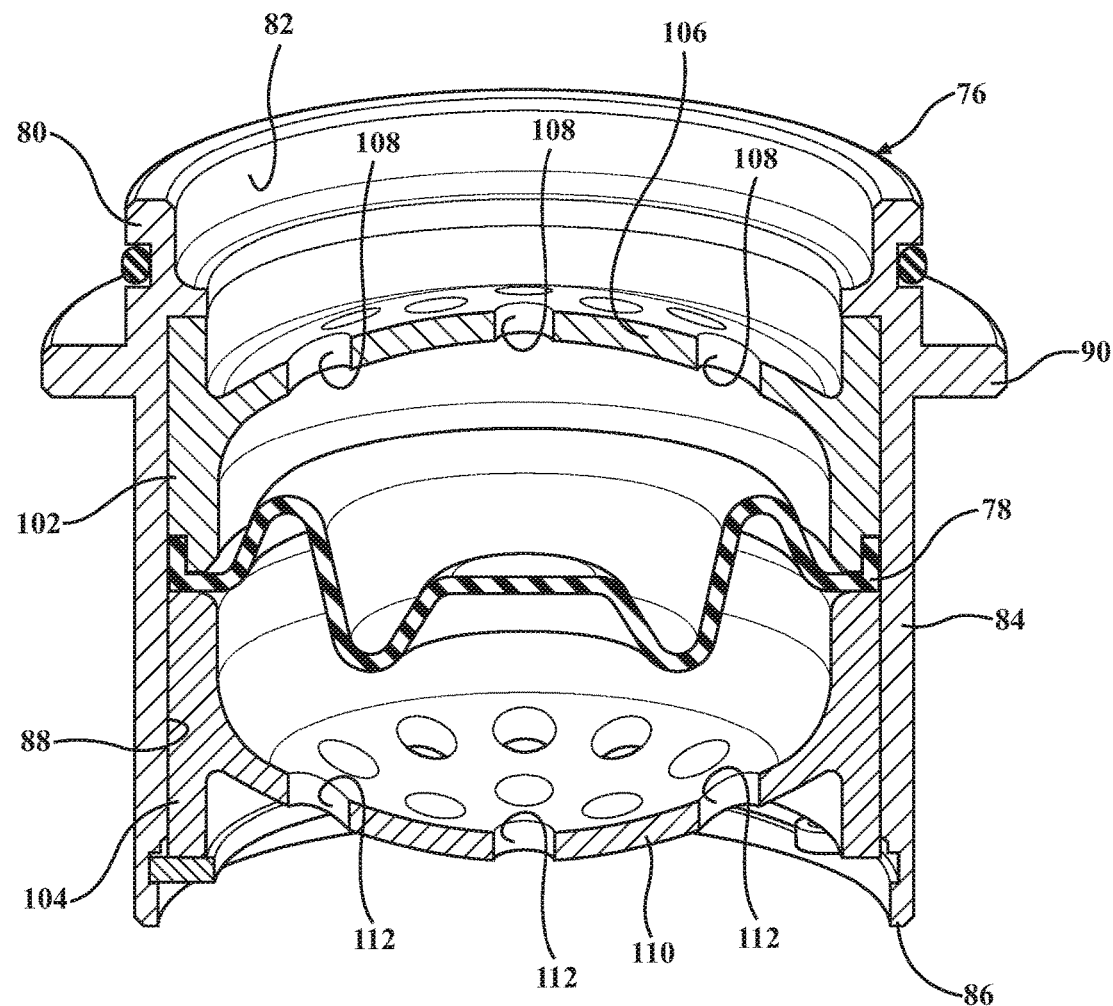
FIG. 3 is an enlarged cross-sectional perspective view of the decoupler as shown in FIG. 2.

Alternatively, in another embodiment of the present invention, as best shown in FIG. 2, the partition member 78 is a diaphragm 78 made from elastomeric material and flexible between the first position and the second position. The diaphragm 78 is disposed on the center axis A and secured in the third chamber 88 of the extension portion 84 isolating the first chamber 32 from the second chamber 74. As best shown in FIG. 3, the decoupler 76 includes a first cover 102 and a second cover 104. The first cover 102, having a tubular shape, is disposed between the diaphragm 78 and the cap portion 80. The second cover 104, having a tubular shape, is disposed spaced from the first cover 102 between the diaphragm 78 and the distal end 86 of the extension portion 84 to secure the diaphragm 78 between the first cover 102 and the second cover 104. In other words, the diaphragm 78 is sandwiched between the first cover 102 and the second cover 104. The first cover 102 includes a first disk 106 having a circular shape and an arcuate shaped cross-section with the first cover 102 bowing away from the diaphragm 78. The first disk 106 defines a plurality of first orifices 108, spaced from one another, in gas communication with the first chamber 32 to allow gas to flow through the first disk 106. The second cover 104 includes a second disk 110 having a circular shape and an arcuate shaped cross-section with the second cover 104 bowing away from the diaphragm 78 and the first disk 106. The second cover 104 defines a plurality of second orifices 112, spaced from one another, in gas communication with the second chamber 74 to allow gas to flow through the second disk 110.

The body 70 of the piston 24 may include a bottom portion 114 having a T-shaped cross-section. The bottom portion 114 is disposed on the center axis A and attached to the proximal end 72 of the body 70 to close the second chamber 74. The bottom portion 114 defines a cavity 115 disposed in gas communication with the second chamber 74 expanding the second volume $V_2$ to between the partition member 78, the body 70 and the bottom portion 114. The bottom portion 114 may also include a second bushing 100 extending outwardly from the bottom portion 114 in an opposite direction of the first bushing 50, along the center axis A, for securing the air suspension assembly 20 to the vehicle.

Figure 4:
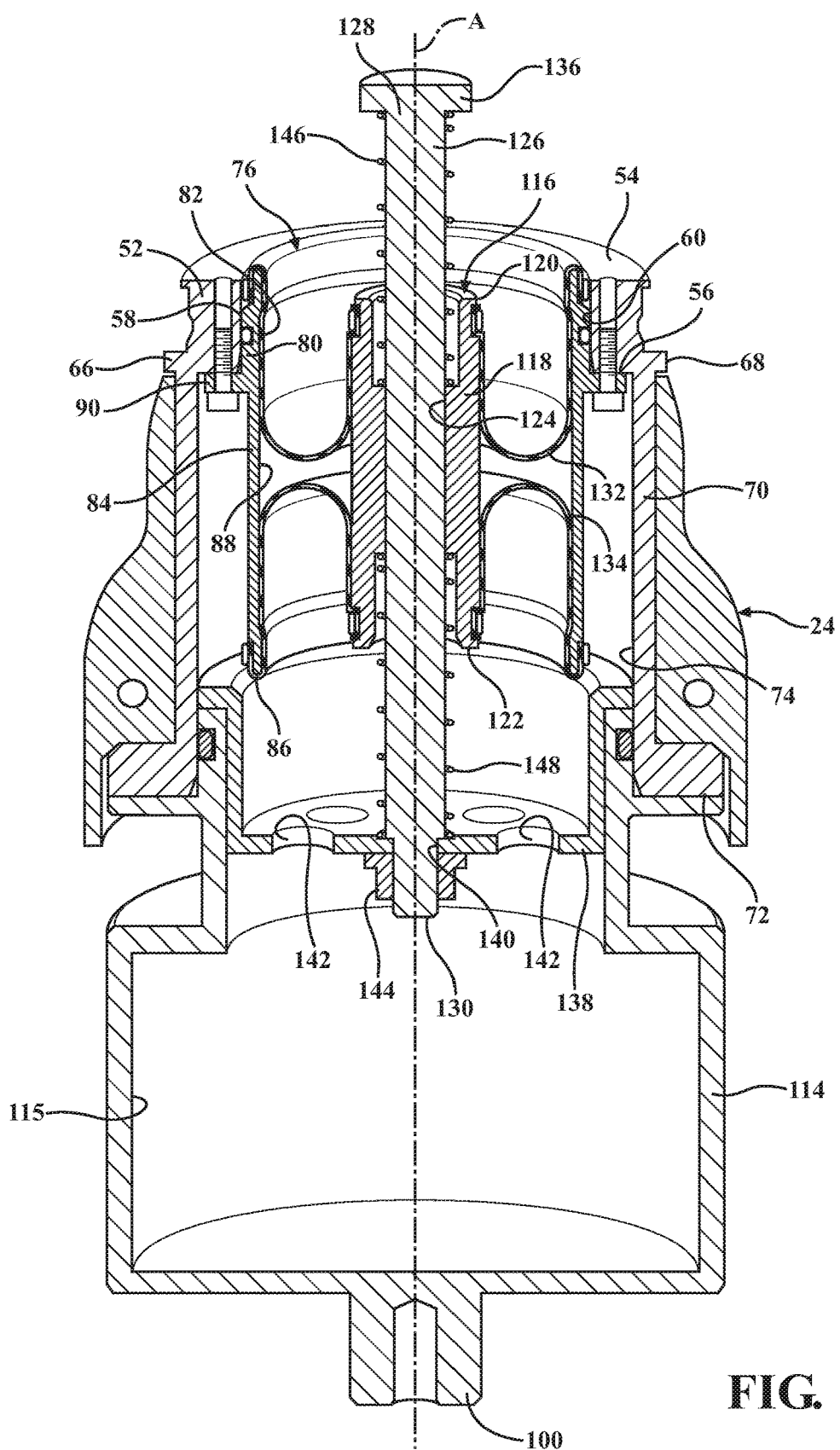
FIG. 4 is a cross-sectional perspective view of an alternative embodiment of the air suspension assembly including an alternative embodiment of the decoupler with a sliding guide.

Alternatively, in another embodiment of the present invention, as best shown in FIG. 4, the partition member 78 includes a sliding guide 116 disposed in the third chamber 88 concentric to and spaced from the extension portion 84. The sliding guide 116 includes a sleeve 118 having a tubular shape disposed in the third chamber 88 of the extension portion 84 and extending between a first sleeve end 120 and a second sleeve end 122. The first sleeve end 120 is disposed adjacent to the cap portion 80. The second sleeve end 122 is disposed adjacent to the distal end 86 of the extension portion 84. The sleeve 118 defines a conduit 124 extending between the first sleeve end 120 and the second sleeve end 122.

A rod 126 is disposed on the center axis A and in the third chamber 88. The rod 126 extends through the conduit 124 of the sliding guide 116 between a first rod end 128 disposed in the first chamber 32 and a second rod end 130 disposed in the second chamber 74. A first divider 132 of elastomeric material, having a U-shaped cross-section, is disposed in the third chamber 88 extending between the first sleeve end 120 and the cap portion 80. A second divider 134 of elastomeric material, having an inverted U-shape cross-section, is disposed in the third chamber 88 extending between the second sleeve end 122 and the distal end 86 of the extension portion 84. The first rod end 128 includes a flange 136 extending radially outwardly from the first rod end 128 and perpendicular to the center axis A.

The body 70 of the piston 24 may include a bottom portion 114, having a T-shaped cross-section, disposed on the center axis A and attached to the proximal end 72 of the body 70 to close the second chamber 74. The bottom portion 114 defines a cavity 115 disposed in gas communication with the second chamber 74 expanding the second volume $V_2$ to between the partition member 78, the body 70 and the bottom portion 114. The bottom portion 114 may also include a second bushing 100 extending outwardly from the bottom portion 114, in an opposite direction of the first bushing 50, along the center axis A for securing the air suspension assembly 20 to the vehicle. A rod guide 138, having a U-shape in cross-section, is disposed in the second chamber 74 and extends annularly about the center axis A between the bottom portion 114 and the distal end 86 of the extension portion 84. The rod guide 138 defines a center aperture 140 disposed on the center axis A for receiving the second rod end 130 and a plurality of pockets 142, each having a circular shape, disposed about and spaced from the center aperture 140 and for allowing gas communication between the third chamber 88 and the cavity 115. A fastener 144, e.g. a nut, is disposed in the cavity 115 and secured to the second rod end 130. A plurality of resilient members 146, 148 including a first resilient member 146 of a spring is disposed in the first chamber 32 and extending about the rod 126 between the flange 136 at the first rod end 128 and the sleeve 118. The plurality of resilient members 146, 148 includes a second resilient member 148 of a spring disposed in the second chamber 74 and extending about the rod 126 between the rod guide 138 and the sleeve 118 sandwiching the sleeve 118 between the first resilient member 146 and the second resilient member 148.

Figure 5:
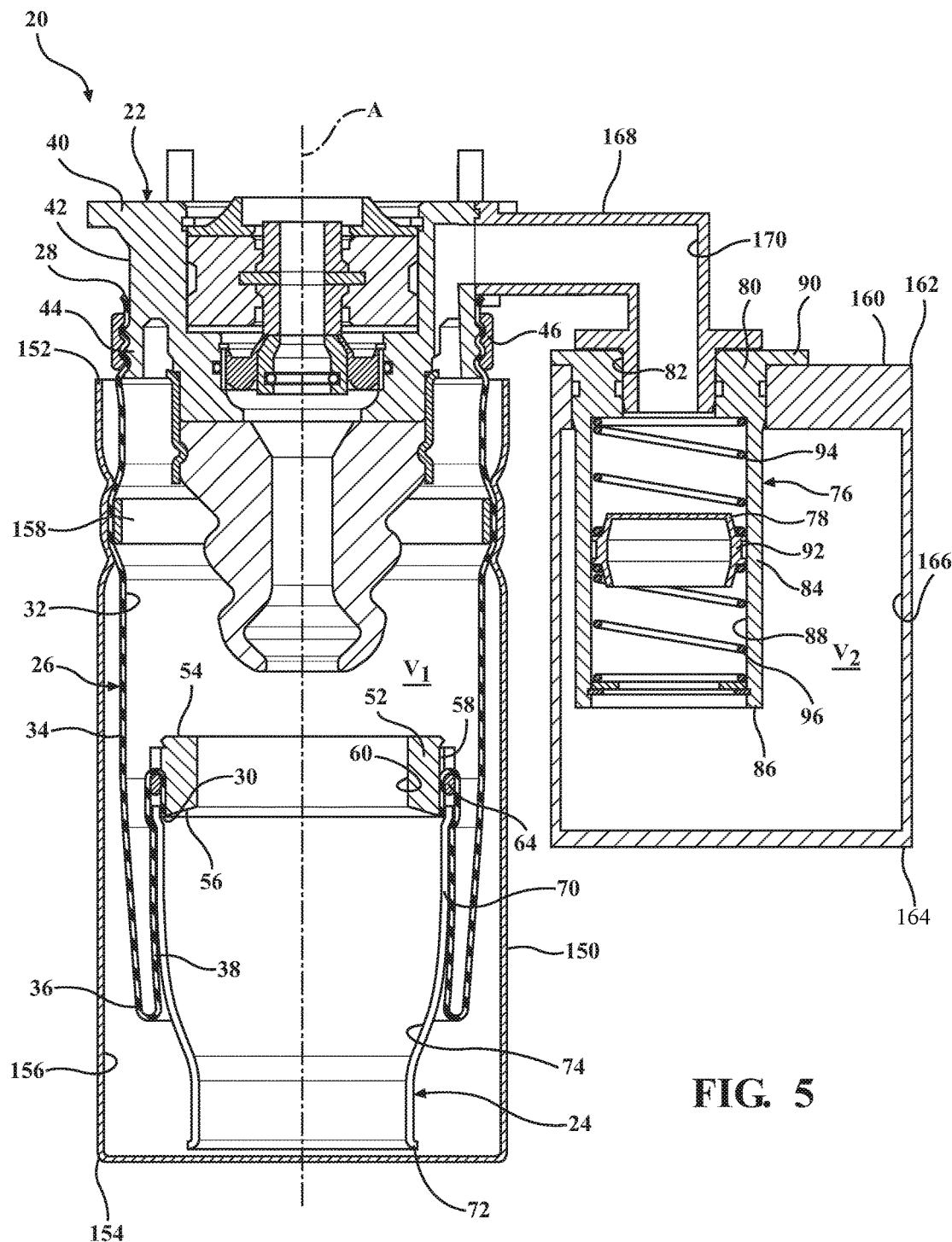
FIG. 5 is a cross-sectional perspective view of an alternative embodiment of the air suspension assembly including a first housing and a second housing.

Alternatively, in another embodiment of the present invention, as generally shown in FIG. 5, the air suspension assembly 20 includes a first housing 150 having a cylindrical shape extending along a center axis A and between a first opened end 152 and a first closed end 154. The first housing 150 defines a first compartment 156 extending along the center axis A between the first opened end 152 and the first closed end 154. A top 22 having a generally cylindrical shape is disposed at the first opened end 152 of the first housing 150. A piston 24, having a tubular shape, is disposed in the first compartment 156 on the center axis A and adjacent to the first closed end 154 of the first housing 150. A bellows 26, made from an elastomeric material and having a tubular shape, is disposed in the first compartment 156 on the center axis A and extending annularly about the center axis A between a first end 28 and a second end 30. The first end 28 of the bellows 26 is secured to the top 22 and the second end 30 of the bellows 26 is secured to the piston 24 defining a first chamber 32 between the top 22 and the piston 24 and the first closed end 154 of the first housing 150. The bellows 26 includes an outer sleeve 34, having a tubular shape, extending from the first end 28 of the bellows 26 to an intermediate end 36 in a parallel relationship with the center axis A. An inner sleeve 38 extends from the intermediate end 36 of the bellows 26, in an arcuate shape, toward the center axis A and toward the first end 28 of the bellows 26 in a parallel relationship with the center axis A and the outer sleeve 34 to the second end 30 to engage the piston 24. A crimp ring 158 having a circular shape is disposed in the first chamber 32 and adjacent to the first opened end 152 of the first housing 150. The crimp ring 158 abuts the bellows 26 to secure the bellows 26 to the first housing 150 in the first compartment 156 to prevent outer sleeve 34 of the bellows 26 from collapsing in the first compartment 156.

The top 22 includes a plate 40 and a side wall 42 having a cylindrical shape extending perpendicularly outwardly from the plate 40 parallel to the center axis A. The side wall 42 defines a plurality of protrusions 44, spaced from one another, extending annularly outwardly from the side wall 42 perpendicular to the center axis A spaced from one another to engage the first end 28 of the bellows 26. A first ring 46 having a circular shape is disposed on the bellows 26 at the first end 28 of the bellows 26 and extending annularly about the side wall 42 of the top 22 to secure the bellows 26 to the side walls 42 of the top 22.

The piston 24 includes an upper portion 52 having a circular shape. The upper portion 52 includes an interior surface 54 disposed in the first chamber 32 facing the top 22 and an exterior surface 56 spaced from the interior surface 54. A periphery 58 extends between the interior surface 54 and the exterior surface 56 and annularly about the center axis A to connect the interior surface 54 with the exterior surface 56. The upper portion 52 further defines a bore 60 having a cylindrical shape disposed on the center axis A in gas communication with the first chamber 32 and extending between the interior surface 54 and the exterior surface 56. A second ring 64 having a circular shape is disposed on the bellows 26 at the second end 30 of the bellows 26 and extending annularly about the upper portion 52 of the piston 24 to secure the bellows 26 to the upper portion 52 of the piston 24. The piston 24 further includes a body 70 of tubular shape extending outwardly from the upper portion 52 and annularly about the center axis A to a proximal end 72 adjacent to the first closed end 154 defining a second chamber 74 between the body 70 and the upper portion 52.

A second housing 160 having a cylindrical shape, spaced from the first housing 150, extends between a second opened end 162 and a second closed end 164 defining a second compartment 166 between the second opened end 162 and the second closed end 164. A pipe 168, having a tubular shape, defines a channel 170 extending between the top 22 and the second opened end 162 of the second housing 160 to connect the second housing 160 with the first chamber 32 and allow gas communication between the first chamber 32 and the second compartment 166 of the second housing 160.

A decoupler 76 is disposed in the second compartment 166 and attached to the second opened end 162 of the second housing 160 and disposed in gas communication with the channel 170. The decoupler 76 includes a partition member 78 extending transversely across the decoupler 76 isolating the first chamber 32 from the second compartment 166 defining a first volume $V_1$ for the first chamber 32 and a second volume $V_2$ for the second compartment 166. The first volume $V_1$ extends between the partition member 78, the top 22, the piston 24, the first housing 150, and the bellows 26. The second volume $V_2$ extends between the partition member 78 and the second housing 160 of the piston 24. In response to a pressure applied to the air suspension assembly 20, the decoupler 76 compensates for changes in pressure in the first chamber 32 and the second chamber 74 by varying the first volume $V_1$ and the second volume $V_2$.

The decoupler 76 includes a cap portion 80 defining a hole 82 and attached to the second opened end 162 of the second housing 160. An extension portion 84, having a tubular shape, is disposed in the second compartment 166 and extending annularly outwardly from the cap portion 80 to a distal end 86 defining a third chamber 88 in gas communication with the channel 170 and the first chamber 32 and the second compartment 166 to receive the partition member 78. The cap portion 80 includes a collar 90 extending radially outwardly from the cap portion 80, annularly about the cap portion 80, and in a perpendicular relationship with the center axis A to engage the second opened end 162 of the second housing 160. It should be appreciated that the cap portion 80 may be secured to the second housing 160 using any means, e.g. nuts and bolts or welding.

The partition member is a diaphragm 78 having a hexagonal shaped cross-section disposed on the center axis A and slidable in the third chamber 88 of the extension portion 84 isolating the first chamber 32 from the second compartment 74. The diaphragm 78 also includes a projection 92 extending radially outwardly from the diaphragm 78 and about the diaphragm 78 in a perpendicular relationship to the center axis A abutting the extension portion 84 of the decoupler 76. A Teflon band may be disposed annularly about the projection 92 between the projection 92 and the extension portion 84 of the decoupler 76 for facilitating with the sliding movement of the diaphragm 78 inside the extension portion 84. A plurality of retaining members 94, 96 including a first retaining member 94 and a second retaining member 96 are disposed in the third chamber 88, spaced apart from one another, and sandwiching the diaphragm 78 between the retaining members 94, 96 to allow the diaphragm 78 to move between a first position and a second position. The first position is defined as being adjacent to the cap portion 80 and the second position is defined as adjacent to the distal end 86 of the extension portion 84 to provide a soft stiffness rate under low stroke and higher stiffness rate under larger strokes. In other words, the diaphragm 78 is sandwiched between the first retaining member 94 and the second retaining member 96 and in the third chamber 88 of the extension portion 84 between the first position and the second position. It should be appreciated that the first retaining member 94 may be a spring disposed in the third chamber 88 extending between the cap portion 80 and the diaphragm 78. In should also be appreciated that the second retaining member 96 may also be a spring disposed in the third chamber 88 extending between the diaphragm 78 and the distal end 86 of the extension portion 84.

Obviously, many modifications and variations of the present invention are possible in light of the above teachings and may be practiced otherwise than as specifically described while within the scope of the appended claims. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. An air suspension assembly comprising;
a top disposed on a center axis,
a piston disposed on said center axis spaced from said top,
a bellows of an elastomeric material extending about said center axis between a first end secured to said top and a second end secured to said piston connecting said top and said piston defining a first chamber extending between said top and said piston and said bellows,
said piston including an upper portion defining a bore disposed on said center axis extending in gas communication with said first chamber,
said piston further including a body extending axially from said upper portion and about said center axis to a proximal end defining a second chamber extending between said body and said upper portion,
a decoupler disposed in said bore of said upper portion attached to said piston and disposed in gas communication with said first chamber and said second chamber, and
said decoupler including a partition member extending transversely across said decoupler isolating said first chamber from said second chamber and defining a first volume for said first chamber between said partition member and said top and said piston and said bellows and a second volume for said second chamber between said partition member and said body for changing pressure in said first chamber and said second chamber by varying said first volume and said second volume in response to a pressure applied to the air suspension assembly,
wherein said decoupler further includes a cap portion defining a hole disposed on said center axis and in said bore and an extension portion of tubular shape disposed in said second chamber and extending axially from said cap portion to a distal end defining a third chamber partially in gas communication with said hole and said first chamber and partially in gas communication with said second chamber to receive said partition member, wherein said partition member is a diaphragm of elastomeric material disposed on said center axis and secured in said third chamber of said extension portion isolating said first chamber from said second chamber and flexible between a first position adjacent to said cap portion and a second position adjacent to said distal end of said extension portion.

2. The air suspension assembly as set forth in claim 1 wherein said cap portion includes a collar extending radially outwardly from said cap portion perpendicular to said center axis and annularly about said cap portion to engage said upper portion.

3. The air suspension assembly as set forth in claim 1 wherein said decoupler includes a first cover of tubular shape disposed between said diaphragm and said cap portion and a second cover of tubular shape spaced from said first cover and disposed between said diaphragm and said distal end of said extension portion to secure said diaphragm between said first cover and said second cover.

4. The air suspension assembly as set forth in claim 3 wherein said first cover includes a first disk of circular shape and having an arcuate shaped cross-section bowing away from said diaphragm and defining a plurality of first orifices allowing fluid to flow through said first disk.

5. The air suspension assembly as set forth in claim 4 wherein said second cover includes a second disk of circular shape and having an arcuate shaped cross-section bowing away from said diaphragm and said first disk and defining a plurality of second orifices allowing fluid to flow through said second disk.

6. The air suspension assembly as set forth in claim 1 wherein said body of said piston includes a bottom portion having a T-shaped cross-section disposed on said center axis attached to said proximal end of said body to close said second chamber and defining a cavity disposed in gas communication with said second chamber with said bottom portion expanding said second volume to between said partition member and said body and said bottom portion.

\* \* \* \* \*